(12) United States Patent
Helland et al.

(10) Patent No.: US 8,314,187 B2
(45) Date of Patent: Nov. 20, 2012

(54) MULTIMODAL MEDIUM DENSITY POLYETHYLENE POLYMER COMPOSITION

(75) Inventors: Irene Helland, Porsgrunn (NO); Merete Skar, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 317 days.

(21) Appl. No.: 12/449,090

(22) PCT Filed: Jan. 24, 2008

(86) PCT No.: PCT/EP2008/000528
§ 371 (c)(1),
(2), (4) Date: Dec. 18, 2009

(87) PCT Pub. No.: WO2008/089978
PCT Pub. Date: Jul. 31, 2008

(65) Prior Publication Data
US 2010/0099824 A1    Apr. 22, 2010

(30) Foreign Application Priority Data
Jan. 25, 2007  (EP) .................................... 07250306

(51) Int. Cl.
*C08L 23/06* (2006.01)
*C08L 23/08* (2006.01)
*C08J 5/18* (2006.01)

(52) U.S. Cl. ......... 525/240; 428/500; 428/523; 525/191
(58) Field of Classification Search .................. 525/191, 525/240; 428/500, 523
See application file for complete search history.

(56) References Cited

U.S. PATENT DOCUMENTS

| | | | |
|---|---|---|---|
| 7,256,239 B2 * | 8/2007 | Helland et al. ................ | 525/240 |
| 7,524,897 B2 * | 4/2009 | Aarila et al. .................... | 525/53 |
| 2003/0088021 A1 | 5/2003 | Van Dun et al. ................ | 525/53 |
| 2005/0054799 A1 | 3/2005 | Kuo et al. ................... | 526/348.1 |
| 2005/0119407 A1 * | 6/2005 | Aarila et al. .................... | 525/53 |
| 2005/0131187 A1 * | 6/2005 | Helland et al. ............. | 526/348.1 |
| 2005/0171283 A1 | 8/2005 | Szul et al. ..................... | 525/191 |

FOREIGN PATENT DOCUMENTS

| | | |
|---|---|---|
| DE | 10326498 | 12/2003 |
| EP | 05 178 68 | 12/1992 |
| EP | 0 859 025 | 3/2003 |
| EP | 1 228 101 | 7/2003 |
| EP | 1 333 044 | 8/2003 |
| EP | 1 375 584 | 1/2004 |
| EP | 1 378 528 | 1/2004 |
| EP | 1 204 685 | 10/2004 |
| EP | 1 100 845 | 11/2004 |
| EP | 1 555 292 | 7/2005 |
| EP | 1 472 298 | 9/2005 |
| EP | 1 655 339 | 5/2006 |
| WO | WO 94/26816 | 11/1994 |
| WO | WO 97/06951 | 2/1997 |
| WO | WO 99/51649 | 10/1999 |
| WO | WO 99/58583 | 11/1999 |
| WO | WO 02/055569 | 7/2002 |
| WO | WO 2004/011546 | 2/2004 |
| WO | WO 2004/056878 | 7/2004 |
| WO | WO 2005/002744 | 1/2005 |
| WO | WO 2006/037603 | 4/2006 |
| WO | WO 2006/045550 | 5/2006 |
| WO | WO 2006/081116 | 8/2006 |

OTHER PUBLICATIONS

International Search Report for PCT/EP2008/000528, dated Apr. 7, 2008.
Written Opinion for PCT/EP2008/000528, dated Apr. 7, 2008.

\* cited by examiner

*Primary Examiner* — Irina S Zemel
*Assistant Examiner* — Jeffrey Lenihan
(74) *Attorney, Agent, or Firm* — Ballard Spahr LLP

(57) ABSTRACT

A multimodal medium density polyethylene polymer obtainable using single site catalysis which comprises at least:
(A) a lower molecular weight (LMW) polyethylene homopolymer component; and
(B) a higher molecular weight (HMW) polyethylene copolymer component which is a copolymer of ethylene and at least one C3-12-alpha olefin;
wherein said multimodal medium density polyethylene polymer has a density of 925 to 945 kg/m$^3$ and a comonomer content of less than 2.5 mol %.

12 Claims, No Drawings

MULTIMODAL MEDIUM DENSITY POLYETHYLENE POLYMER COMPOSITION

CROSS-REFERENCE TO RELATED APPLICATIONS

The present application is a National Phase Application of International Application No. PCT/EP2008/000528, filed Jan. 24, 2008, which claims priority to European Patent Application No. 07250306.3 filed Jan. 25, 2007, which applications are incorporated herein fully by this reference.

This invention relates to a multimodal medium density polyethylene polymer (referred herein as multimodal MDPE) and to films comprising said multimodal MDPE.

It is now known that a bimodal polymer offers certain advantages over a unimodal polymer in particular with regard to its processability. Bimodal polymers tend to have broad molecular weight distributions which allow processing conditions to be more rigorous than those typically employed when unimodal polymers are employed.

Unfortunately, the increase in processability is associated with a reduction in optical properties in films formed from the polymer. Moreover, the increase in density required to achieve high stiffness in a bimodal polymer causes a reduction in optical properties and some mechanical properties such as impact.

Thus, the problem faced by the film manufacturer is that by trying to improve one property, another equally important property tends to be detrimentally affected.

In WO02/055569, the inventors try to maximise optical and mechanical properties using linear low density polymers (LLDPE's) formed using metallocene catalysis. However, the LLDPE's used are unimodal and are therefore of narrow molecular weight distribution and hence poor processability.

WO94/26816 tries to solve the problem of poor processability of metallocene LLDPE's by proposing their manufacture in the gas phase using supports. Again, however there is no suggestion of using a multimodal polyethylene.

Many inventors have therefore sought to maximise the film properties they obtain by mixing components. For example, low density polyethylene (LDPE) gives rise to films having excellent optical properties (low haze, high gloss) and can be processed at low temperatures and pressures, however, films made from LDPE have low stiffness.

Optical properties have been improved by using linear low density polyethylenes produced using metallocene (mLLDPE's), but at the expense of processability. Also the bubble stability during film blowing is compromised.

Various blends of these materials have therefore been proposed in the art to try to maximise film performance by combining the advantageous properties of certain polymers. Thus for example, LDPE and mLLDPE have been blended to form films. However when mixtures of polymers are employed, there is a potential issue of polymer compatibility, e.g. whether a homogeneous mixture will be formed between the components.

Moreover, there is an increasing trend in the industry for polymer properties to be dictated by end users. For film applications, end users often want increased stiffness. Increased stiffness is normally achieved by increasing density. It is however, well known that by increasing polymer density, the mechanical properties, as well as the optical properties, will be reduced.

There is thus a need for a polymer that can provide the necessary balance of properties without having to automatically resort to mechanical polymer blends.

The object of the present invention is to provide further polymer materials with an unexpected property combination which offers a desirable alternative for many film applications.

The inventors have surprisingly found that a multimodal medium density polyethylene polymer (multimodal MDPE) having a certain comonomer distribution and content as defined below provides excellent mechanical properties. Advantageously, the polyethylene polymer of the invention has increased density, i.e. increased stiffness, while the mechanical properties are maintained or even improved compared to those of LLDPE.

Preferably also, the optical properties of the multimodal MDPE of the invention are at the same level or even increased compared to optical properties of LLDPE. Furthermore, the optical properties of the multimodal MDPE of the invention may also be better compared to unimodal MDPE prior art materials.

The comonomer content of the multimodal MDPE of the invention can be defined in two alternative ways which are independent from each other.

Thus, according to the first alternative the invention concerns a multimodal medium density polyethylene (multimodal MDPE) polymer obtainable using single site catalysis which comprises at least:
(A) a lower molecular weight (LMW) polyethylene homopolymer component
(B) a higher molecular weight (HMW) polyethylene copolymer component which is a copolymer of ethylene and at least one C3-12-alphaolefin;
wherein said multimodal medium density polyethylene polymer has a density of 925 to 945 kg/m$^3$ and a comonomer content of less than 2.5 mol %.

According to the second alternative the invention provides a multimodal medium density polyethylene polymer obtainable using single site catalysis which comprises at least:
(A) a lower molecular weight (LMW) polyethylene homopolymer component; and
(B) a higher molecular weight (HMW) polyethylene copolymer component which is a copolymer of ethylene and at least one C3-12-alpha olefin;
wherein said multimodal medium density polyethylene polymer has a density of 925 to 945 kg/m$^3$ and wherein at least 6 wt % of said multimodal medium density polyethylene polymer elutes in Temperature Rising Elution Fractionation (TREF) analysis at a temperature 60° C. or below, calculated based on the total weight of crystallisable polymer fractions, when determined using TREF analysis in the range of 20 to 135° C.

The multimodal medium density polyethylene polymer of the second alternative of the invention has preferably a comonomer content of less than 2.5 mol % and at least 6 wt % of said multimodal medium density polyethylene polymer will elute in TREF analysis at a temperature 60° C. or below, calculated based on the total weight of crystallisable polymer fractions, when determined using TREF analysis in the range of 20 to 135° C.

The below further description of the preferable properties and embodiments of the invention apply independently in any combination(s) and in any order for both of the first and second alternatives of the multimodal MDPE of the invention.

Unexpectedly, the multimodal MDPE polymer of the invention with a low comonomer content (e.g. measured through TREF or through the actual comonomer content), which is present in the HMW component, provides excellent mechanical properties expressed inter alia as impact resistance (also called as impact strength). Preferably the multimodal MDPE of the invention has an advantageous property balance between impact resistance and optical properties expressed as haze and/or gloss.

More preferably also the processability of said MDPE is excellent. These properties are highly desirable in many film applications.

Viewed from another aspect the invention provides a composition formed from the multimodal medium density polyethylene polymer as hereinbefore described.

Viewed from another aspect the invention provides a film formed from the multimodal medium density polyethylene polymer as hereinbefore described.

Preferably the multimodal MDPE polymer of the invention has a Dart Drop (g/50%) of at least 300 g when measured according to ISO 7765-1 method A using a blown film sample as prepared according to the method described below under "Film Sample preparation" with a film thickness of 40 µm:

Preferably when the polymer is formed as a blown film, it has a haze/thickness ratio (%/µm) of less than 2.0 especially when measured using a blown film sample as prepared according to the method described under "Film Sample preparation" below.

In one preferable embodiment the invention thus provides a single site catalyst produced multimodal medium density polyethylene polymer which contains at least a lower molecular weight (LMW) polyethylene homopolymer component and a higher molecular weight (HMW) polyethylene copolymer component, wherein said multimodal polyethylene polymer has a $MFR_2$ of 5 g/10 min or less (determined according to ISO 1133 at 190° C. at load of 2.16 kg), a Mw/Mn of at least 3, a comonomer content of less than 2.5 mmol % and a density of 925 to 945 $kg/m^3$.

Viewed from another aspect the invention provides a film formed from a single site catalyst produced multimodal polyethylene polymer which contains at least a lower molecular weight (LMW) polyethylene homopolymer component and a higher molecular weight (HMW) polyethylene copolymer component comprising ethylene and at least one C3-12 alpha-olefin, wherein said multimodal polyethylene polymer has a $MFR_2$ of 5 g/10 min or less (determined according to ISO 1133 at 190° C. at load of 2.16 kg), a Mw/Mn of at least 3, a comonomer content of less than 2.5 mol % and a density of 925 to 945 $kg/m^3$;

wherein said film has a Dart Drop (g/50%) of at least 300 g when measured according to ISO 7765-1, method A on a blown film with a film thickness of 40 µm;

and a haze/thickness ratio (%/µm) of less than 2.0. The film sample used for the measurements of the film properties were prepared according to a method as described below under "Film Sample Preparation".

Viewed from another aspect the invention provides a process for the preparation of a multimodal polyethylene as herein before defined comprising in a first liquid phase stage, polymerising ethylene in the presence of a polymerisation catalyst to form a LMW component and subsequently polymerising ethylene and at least one C3-12 alpha-olefin in the gas phase using a polymerisation catalyst, preferably the same catalyst and in the presence of the reaction product obtained from the first liquid stage, to form a HMW component.

Viewed from another aspect the invention provides the use of the multimodal medium density polyethylene polymer, composition or film as hereinbefore described in packaging, e.g. food packaging.

The multimodal medium density polyethylene (multimodal MDPE) polymer of the invention has improved stiffness, impact and optical properties compared to prior art MDPE compositions.

The MDPE polymer of the invention is produced by a single site catalyst. Thus, all components of the MDPE polymer are made using single site catalyst technology. Whilst individual components might be formed using different single site catalysts, it is preferred if all the components of the MDPE polymer are prepared by the same single site catalyst. Thus the invention provides a very homogeneous blend of components to form the medium density polyethylene polymer of the invention.

Properties of the Multimodal Medium Density Polyethylene Component

Naturally, all the preferred features described above and below apply generally to the multimodal MDPE polymer of the invention in any combination as a preferable subgroup(s) of the invention.

A multimodal MDPE polymer of the invention is multimodal at least with respect to the molecular weight distribution. It therefore contains at least a component (A) with a lower weight average molecular weight (LMW) and a component (B) with a higher weight average molecular weight (HMW).

Usually, a MDPE polymer comprising at least two polyethylene fractions, which have been produced under different polymerisation conditions resulting in different (weight average) molecular weights and molecular weight distributions for the fractions, is referred to as "multimodal". The prefix "multi" relates to the number of different polymer fractions present in the polymer. Thus, for example, a polymer consisting of two fractions only is called "bimodal". The form of the molecular weight distribution curve, i.e. the appearance of the graph of the polymer weight fraction as function of its molecular weight, of a multimodal polyethylene will show two or more maxima or at least be distinctly broadened in comparison with the curves for the individual fractions. For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

In any multimodal polyethylene there is by definition a lower molecular weight component (LMW) and a higher molecular weight component (HMW). The LMW component has a lower molecular weight than the higher molecular weight component. Preferably there may be a difference in molecular weight of at least 1000, preferably at least 5000 between components.

The multimodal polyethylene of the invention is preferably bimodal or trimodal, especially bimodal.

The claimed multimodal MDPE is also multimodal with respect to comonomer distribution as one component is homopolymeric and another copolymeric. Different distributions of comonomer therefore exist between the components. Without binding to any theory it is believed that the present comonomer distribution mentioned above contributes to the advantageous combination of increased density and good mechanical properties of the multimodal MDPE of the invention.

The composition of the invention comprises a multimodal polyethylene polymer which has a density in the medium density range. The multimodal polyethylene should have a density of between 925-945 kg/m$^3$, preferably in the range of from 927 to 940 kg/m$^3$, such as 929 to 936 kg/m$^3$ (ISO 1183).

The MFR$_2$ of the multimodal polyethylene polymer is typically 5 g/10 min or less; preferably in the range 0.01 to 5 g/10 min, more preferably 0.1 to 3 g/10 min, more preferably. 0.1-2.5 g/10 min, e.g. 0.5 to 1.5, e.g. 1 g/10 min.

The MFR$_{21}$ for multimodal LLDPE should be in the range 5 to 200, preferably 10 to 100 g/10 min. The Mw of multimodal polyethylene should be in the range 100,000 to 250,000, preferably 120,000 to 200,000. The Mw/Mn for multimodal polyethylene should be less than 30, preferably 3 to 10, such as 4 to 8.

As the multimodal medium density polyethylene of the invention contains at least homopolymer and copolymer components, it is thus formed from ethylene along with at least one C$_{3-12}$ alpha-olefin comonomer, e.g. 1-butene, 1-hexene or 1-octene. Preferably, the multimodal medium density polyethylene is a binary copolymer, i.e. the polymer (and hence the HMW component too) contains ethylene and one comonomer, or is a terpolymer, i.e. the polymer (and hence also the HMW component) contains ethylene and two comonomers. Moreover, the copolymer component may be formed from ethylene with three or more comonomers. Preferably, the multimodal polyethylene comprises an ethylene copolymer with one or two of butene, pentene, hexene, heptene or octene. In one preferable embodiment the multimodal MDPE comprises an ethylene hexene copolymer, ethylene octene copolymer or ethylene butene copolymer as the HMW component. In another preferable embodiment the multimodal MDPE comprises a copolymer of ethylene with butene and hexene.

The term "ethylene copolymer" is used in this context to encompass polymers comprising repeat units deriving from ethylene and at least one other C3-12 alpha olefin monomer. Preferred copolymers are binary and comprise a single comonomer or are terpolymers and comprise two comonomers.

In contrast the term "ethylene homopolymer" as used herein is intended to encompass polymers which consist essentially of repeat units deriving from ethylene. Homopolymers may, for example, comprise at least 99.8%, preferably at least 99.9%, by weight of repeat units deriving from ethylene.

Preferably, the multimodal MDPE consists of a homopolymer component and a copolymer component.

In a highly preferred embodiment the LMW component is a homopolymer, and the HMW component is a binary copolymer of ethylene or a terpolymer of ethylene, preferably a binary ethylene hexene or ethylene butene copolymer.

The amount of comonomer present in the multimodal medium density polyethylene polymer of the invention is preferably less than 2.5 mol %, such as less than 2.3 mol %, especially less than 2.2 mol %. The amount of comonomer in MDPE of the invention may be e.g. at least 0.1 mol %, preferably 0.5 mol % or more, such as 1 mol % or more.

TREF is an analytical technique for detecting the distribution of chain crystallizabilities of semicrystalline polymers. This technique fractionates polymer chains on the basis of the differences in their chain microstructures that affect their crystallizabilities in dilute solution and thereby it is reflecting the comonomer distribution It is preferred therefore if at least 6 wt % of said multimodal medium density polyethylene polymer elutes in TREF analysis at a temperature 60° C. or below, calculated based on the total weight of crystallisable polymer fractions, when determined using TREF analysis in the range of 20 to 135° C. Preferably at least 8 wt % of said multimodal polymer elutes in TREF analysis at a temperature 60° C. or below, more preferably at least 10 wt %, especially at least 15 wt % of said multimodal polymer elutes in TREF analysis at a temperature 60° C. or below.

Typically, the amount of MDPE of the invention eluting in TREF at a temperature 60° C. or below is up to 50 wt %.

The comonomer content of the copolymer component, i.e. of the HMW component, present in the multimodal MDPE of the invention is typically 4.0 mol-% or less, preferably 3.7 mol-% or less, more preferably 3.6 mol-% or less.

The lower molecular weight component of the multimodal polyethylene preferably has a MFR$_2$ of at least 5 g/10 min, such as at least 10 g/10 min. The upper limit of the MFR$_2$ of LMW component is not critical and is typically below 300 g/10 min, such as below 200 g/10 min. The molecular weight of the low molecular weight component may preferably range from 20,000 to 50,000, e.g. 25,000 to 40,000.

The density of the LMW component may range from 945 to 980 kg/m$^3$, preferably 950 to 975 kg/m$^3$, more preferably 965 to 975 kg/m$^3$.

The lower molecular weight component may preferably form 30 to 70 wt %, e.g. 40 to 60% by weight of the multimodal polyethylene with the higher molecular weight component forming 70 to 30 wt %, e.g. 40 to 60% by weight.

The higher molecular weight component may have a lower MFR$_2$ and a lower density than the lower molecular weight component.

The HMW component may have an MFR$_2$ of less than 1 g/10 min, preferably less than 0.5 g/10 min, especially less than 0.2 g/10 min. The density of HMW component is typically less than 930 kg/m$^3$, such as 900-920 kg/m$^3$. The Mw of the higher molecular weight component may range from 100,000 to 1,000,000, preferably 250,000 to 500,000.

The multimodal MDPE polymer of the invention may include a prepolymerised fraction in a manner well known in the art. In this embodiment therefore said multimodal MDPE polymer is preferably bimodal or trimodal, more preferably a bimodal MDPE consisting of LMW component (A), HMW component (B) and, optionally, the prepolymerised fraction as defined below.

The multimodal MDPE polymer of the invention may comprise up to 10% by weight of a such a polyethylene prepolymer (obtainable from a prepolymerisation step as well known in the art). Where a prepolymerised polymer is present, the prepolymer component forms part of one of LMW and HMW components (A) and (B), preferably LMW component (A), and this component still has the properties defined above.

All components of the MDPE polymer of the invention are obtainable using a single site catalyst. More preferably the components are produced using a single site catalyst selected from metallocenes or non-metallocenes, preferably metallocenes. The terms "metallocene" and "non-metallocene" are well known in the polymer field. The MDPE polymer of the invention may be referred herein also as "single site produced MDPE polymer", and when the single site catalyst is metallocene, then as an mMDPE polymer.

The multimodal MDPE polymer of the invention may be a mechanical blend, in situ-blend or a combination of a mechanical and in-situ blend, preferably in-situ blend, of the polyethylene components comprising at least the LMW component (A) and HMW component (B). The term "in situ blend" is well known in the art and means that the blend is formed by producing the first component and then by producing the second or further component(s) in the presence of the previously formed component(s).

The present invention also provides a method for preparing the multimodal MDPE polymer of the invention.

Multimodal polyethylene polymers may be prepared for example by two or more stage polymerization or by the use of two or more different polymerization catalysts in a one stage polymerization. It is also possible to employ a multi- or dualsite catalyst. It is important to ensure that the higher and lower molecular weight components are intimately mixed prior to extrusion. This is most advantageously achieved by using a multistage process or a dual site.

Preferably the multimodal polyethylene is produced in a two-stage polymerization using the same catalyst, e.g. a metallocene catalyst. Thus, two slurry reactors or two gas phase reactors could be employed. Preferably however, the multimodal polyethylene is made using a slurry polymerization in a loop reactor followed by a gas phase polymerization in a gas phase reactor.

A loop reactor—gas phase reactor system is marketed by Borealis as a BORSTAR reactor system. Any multimodal polyethylene of use in the outer layer is thus preferably formed in a two stage process comprising a first slurry loop polymerisation followed by gas phase polymerisation. Such multistage process is disclosed e.g. in EP517868.

The conditions used in such processes are well known. For slurry reactors, the reaction temperature will generally be in the range 60 to 110° C. (e.g. 85-110° C.), the reactor pressure will generally be in the range 5 to 80 bar (e.g. 50-65 bar), and the residence time will generally be in the range 0.3 to 5 hours (e.g. 0.5 to 2 hours). The diluent used will generally be an aliphatic hydrocarbon having a boiling point in the range −70 to +100° C. Preferred diluents include hydrocarbons such as propane or isobutane. Hydrogen is also preferably fed into the reactor to function as a molecular weight regulator.

If gas phase reactions are employed then conditions are preferably as follows:
the temperature is within the range of 50° C. to 130° C., preferably between 60° C. and 115° C.,
the pressure is within the range of 10 bar to 60 bar, preferably between 10 bar to 40 bar,
hydrogen can be added for controlling the molar mass in a manner known per se,
the residence time is typically 1 to 8 hours.

The gas used will commonly be a non-reactive gas such as nitrogen or low boiling point hydrocarbons such as propane together with monomer (e.g. ethylene).

As an example a chain-transfer agent, preferably hydrogen, is added as required to the reactors, and at least 100 to preferably at least 200, and up to 1500, preferably up to 800 moles of $H_2$/kmoles of ethylene are added to the loop reactor, when the LMW fraction is produced in this reactor, and 0 to 60 or 0 to 50, and, again depending on the desired end application, in certain embodiments even up to 100, or up to 500 moles of $H_2$/kmoles of ethylene are added to the gas phase reactor when this reactor is producing the HMW fraction.

If desired, the polymerisation may be effected in a known manner under supercritical conditions in the slurry, preferably loop reactor, and/or as a condensed mode in the gas phase reactor.

The gas phase polymerisation may be conducted in a manner known in the art, such as in a bed fluidised by gas feed or in mechanically agitated bed. Also fast fluidisation may be utilised.

Preferably, the lower molecular weight polymer fraction is produced in a continuously operating loop reactor where ethylene is polymerised in the presence of a polymerisation catalyst as stated below and a chain transfer agent such as hydrogen. The diluent is typically an inert aliphatic hydrocarbon, preferably isobutane or propane.

The higher molecular weight component can then be formed in a gas phase reactor, preferably using the same catalyst.

The multistage process wherein the LMW component as defined above is produced in a slurry process and the HMW component is produced in a gas phase reactor in the presence of the LMW component of the previous step, results in a particularly preferable combination.

The process is typically carried out as a continuous process.

Thus, viewed from a further aspect, the invention provides a process for the preparation of a multimodal polyethylene as herein before defined comprising in a first liquid phase stage, polymerising ethylene and optionally at least one $C_{3-12}$ alpha-olefin in the presence of a polymerisation catalyst to form a LMW component and subsequently polymerising ethylene and at least one C3-12 alpha-olefin in the gas phase using a polymerisation catalyst, preferably in the presence of the reaction product obtained from the first liquid stage, to form a HMW component.

A prepolymerisation step may be included in a well known manner before the above described actual polymerisation steps to provide the prepolymer component mentioned above.

Where the higher molecular weight component is made second in a multistage polymerisation it is not possible to measure its properties directly. However, the skilled man is able to determine the density, $MFR_2$ etc of the higher molecular weight component using Kim McAuley's equations. Thus, both density and $MFR_2$ can be found using K. K. McAuley and J. F. McGregor: On-line Inference of Polymer Properties in an Industrial Polyethylene Reactor, AIChE Journal, June 1991, Vol. 37, No, 6, pages 825-835.

The density is calculated from McAuley's equation 37, where final density and density after the first reactor is known.

$MFR_2$ is calculated from McAuley's equation 25, where final $MFR_2$ and $MFR_2$ after the first reactor is calculated. The use of these equations to calculate polymer properties in multimodal polyethers is common place.

The multimodal polyethylene may be made using conventional single site catalysis as is known in the art. The single site catalyst used for making the desired component is not critical, (including well known metallocenes and non-metallocenes).

Preferably said catalyst is one comprising a metal coordinated by one or more η-bonding ligands. Such n-bonded metals are typically Zr, Hf or Ti, especially Zr or Hf. The η-bonding ligand is typically an $η^5$-cyclic ligand, i.e. a homo or heterocyclic cyclopentadienyl group optionally with fused or pendant substituents. Such single site, preferably metallocene procatalysts, have been widely described in the scientific and patent literature for about twenty years.

The metallocene procatalyst may have a formula II:

$$(Cp)_m R_n MX_q \qquad (II)$$

wherein:
each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand;
the optional one or more substituent(s) being independently selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR"$_3$, —SR", —PR"$_2$ or —NR"$_2$, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom to which they are attached;

R is a bridge of 1-7 atoms, e.g. a bridge of 1-4 C-atoms and 0-4 heteroatoms, wherein the heteroatom(s) can be e.g. Si, Ge and/or O atom(s), wherein each of the bridge atoms may bear independently substituents, such as $C_{1-20}$-alkyl, tri($C_{1-20}$-alkyl)silyl, tri($C_{1-20}$-alkyl)siloxy or $C_{6-20}$-aryl substituents); or a bridge of 1-3, e.g. one or two, hetero atoms, such as silicon, germanium and/or oxygen atom(s), e.g. $SiR^1_2$—, wherein each $R^1$ is independently $C_{1-20}$-alkyl, $C_{6-20}$-aryl or tri($C_{1-20}$-alkyl)silyl-residue, such as trimethylsilyl;

M is a transition metal of Group 3 to 10, preferably of Group 4 to 6, such as Group 4, e.g. Ti, Zr or Hf, especially Hf;

each X is independently a sigma-ligand, such as H, halogen, $C_{1-20}$-alkyl, $C_{1-20}$-alkoxy, $C_2$-$C_{20}$-alkenyl, $C_2$-$C_{20}$-alkynyl, C3-C12-cycloalkyl, C6-$C_{20}$-aryl, C6-$C_{20}$-aryloxy, C7-$C_{20}$-arylalkyl, C7-C20-arylalkenyl, —SR", —PR"$_3$, —SiR"$_3$, —OSiR"$_3$, —NR"$_2$ or —CH$_2$—Y, wherein Y is C6-C20-aryl, C6-C20-heteroaryl, C1-$C_{20}$-alkoxy, C6-C20-aryloxy, NR"$_2$, —SR", —PR"$_3$, —SiR"$_3$, or —OSiR"$_3$;

each of the above mentioned ring moieties alone or as a part of another moiety as the substituent for Cp, X, R" or R1 can further be substituted e.g. with C1-C20-alkyl which may contain Si and/or O atoms;

n is 0, 1 or 2, e.g. 0 or 1, m is 1, 2 or 3, e.g. 1 or 2, q is 1, 2 or 3, e.g. 2 or 3, wherein m+q is equal to the valency of M.

Suitably, in each X as —CH$_2$—Y, each Y is independently selected from C6-C20-aryl, NR"$_2$, —SiR"$_3$ or —OSiR"$_3$. Most preferably, X as —CH$_2$—Y is benzyl. Each X other than —CH$_2$—Y is independently halogen, C1-C20-alkyl, C1-C20-alkoxy, C6-C20-aryl, C7-C20-arylalkenyl or —NR"$_2$ as defined above, e.g. —N(C1-C20-alkyl)$_2$.

Preferably, q is 2, each X is halogen or —CH$_2$—Y, and each Y is independently as defined above.

Cp is preferably cyclopentadienyl, indenyl, tetrahydroindenyl or fluorenyl, optionally substituted as defined above.

In a suitable subgroup of the compounds of formula II, each Cp independently bears 1, 2, 3 or 4 substituents as defined above, preferably 1, 2 or 3, such as 1 or 2 substituents, which are preferably selected from C1-C20-alkyl, C6-C20-aryl, C7-C20-arylalkyl (wherein the aryl ring alone or as a part of a further moiety may further be substituted as indicated above), —OSiR"$_3$, wherein R" is as indicated above, preferably C1-C20-alkyl:

R, if present, is preferably a methylene, ethylene or a silyl bridge, whereby the silyl can be substituted as defined above, e.g. a (dimethyl)Si=, (methylphenyl)Si= or (trimethylsilylmethyl)Si=; n is 0 or 1; m is 2 and q is two. Preferably, R" is other than hydrogen.

A specific subgroup includes the well known metallocenes of Zr, Hf and Ti with two η-5-ligands which may be bridged or unbridged cyclopentadienyl ligands optionally substituted with e.g. siloxy, or alkyl (e.g. C1-6-alkyl) as defined above, or with two unbridged or bridged indenyl ligands optionally substituted in any of the ring moieties with e.g. siloxy or alkyl as defined above, e.g. at 2-, 3-, 4- and/or 7positions. Preferred bridges are ethylene or —SiMe$_2$.

The preparation of the metallocenes can be carried out according or analogously to the methods known from the literature and is within skills of a person skilled in the field. Thus for the preparation see e.g: EP-A-129 368, examples of compounds wherein the metal atom bears a —NR"$_2$ ligand see i.a. in WO-A-9856831 and WO-A-0034341. For the preparation see also e.g. in EP-A-260 130, WO-A-9728170, WO-A-9846616, WO-A-9849208, WO-A-9912981, WO-A-9919335, WO-A-9856831, WO-A-00/34341, EP-A-423 101 and EP-A-537 130.

Alternatively, in a further subgroup of the metallocene compounds, the metal bears a Cp group as defined above and additionally a η1 or η2 ligand, wherein said ligands may or may not be bridged to each other. Such compounds are described e.g. in WO-A-9613529, the contents of which are incorporated herein by reference.

Further preferred metallocenes include those of formula (I)

$Cp'_2HfX'_2$ wherein each X' is halogen, $C_{1-6}$ alkyl, benzyl or hydrogen;

Cp' is a cyclopentadienyl or indenyl group optionally substituted by a $C_{1-10}$ hydrocarbyl group or groups and being optionally bridged, e.g. via an ethylene or dimethylsilyl link. Bis (n-butylcyclopentadienyl) hafnium dichloride and Bis (n-butylcyclopentadienyl) hafnium dibenzyl are particularly preferred.

Metallocene procatalysts are generally used as part of a catalyst system which also includes a cocatalyst or catalyst activator, for example, an aluminoxane (e.g. methylaluminoxane (MAO), hexaisobutylaluminoxane and tetraisobutylaluminoxane) or a boron compound (e.g. a fluoroboron compound such as triphenylpentafluoroboron or triphentylcarbenium tetraphenylpentafluoroborate (($C_6H_5$)$_3$B+B—($C_6F_5$)$_4$)). The preparation of such catalyst systems is well known in the field.

If desired the procatalyst, procatalyst/cocatalyst mixture or a procatalyst/cocatalyst reaction product may be used in unsupported form or it may be precipitated and used as such. One feasible way for producing the catalyst system is based on the emulsion technology, wherein no external support is used, but the solid catalyst is formed from by solidification of catalyst droplets dispersed in a continuous phase. The solidification method and further feasible metallocenes are described e.g. in WO03/051934 which is incorporated herein as a reference.

The activator is a compound which is capable of activating the transition metal component. Useful activators are, among others, aluminium alkyls and aluminium alkoxy compounds. Especially preferred activators are aluminium alkyls, in particular aluminium trialkyls, such as trimethyl aluminium, triethyl aluminium and tri-isobutyl aluminium. The activator is typically used in excess to the transition metal component. For instance, when an aluminium alkyl is used as an activator, the molar ratio of the aluminium in the activator to the transition metal in the transition metal component is from 1 to 500 mol/mol, preferably from 2 to 100 mol/mol and in particular from 5 to 50 mol/mol.

It is also possible to use in combination with the above-mentioned two components different co-activators, modifiers and the like. Thus, two or more alkyl aluminium compounds may be used, or the catalyst components may be combined with different types of ethers, esters, silicon ethers and the like to modify the activity and/or the selectivity of the catalyst, as is known in the art.

Suitable combinations of transition metal component and activator are disclosed among others, in the examples of WO 95/35323.

Conventional cocatalysts, supports/carriers, electron donors etc can be used.

Film Formation and Properties

The multimodal MDPE polymer of the invention is preferably formed into films. Thus, a film of the present invention comprises at least one layer, which layer comprises the multimodal MDPE polymer of the invention alone or together with further, e.g. one or two, polymer component(s) and optionally together with additives conventionally used in the film production, as defined below. Thus the films of the present invention may comprise a single layer (i.e. monolayer) or may be multilayered (e.g. comprise 2 to 7 layers). Multilayer films preferably comprise typically 2 to 5 layers, especially 2 or 3 layers.

The films may be made by any conventional film extrusion procedure known in the art including cast film and blown film extrusion. Thus the film may be produced by extrusion through an annular die and blowing into a tubular film by forming a bubble which is collapsed between nip rollers after solidification. This film can then be slit, cut or converted (e.g. gusseted) as desired. Conventional film production techniques may be used in this regard. If the film is a multilayer film then the various layers are typically coextruded. The skilled man will be aware of suitable extrusion conditions. Generally, however, extrusion is carried out at a temperature in the range 160° C. to 240° C., and cooled by blowing gas (generally air) at a temperature of 10 to 50° C. to provide a frost line height of up to 10 times, typically of 2 to 8 times the diameter of the die. The blow up ratio should generally be in the range 2 to 5, preferably 2.5 to 4.

The thickness of the film is not critical and depends on the end use. Thus films may have a thickness of e.g. 300 µm or less, typically 6 to 200 µm, preferably 10 to 180 µm, e.g. 20 to 150 µm or 20 to 120 µm. If desired, the polymer of the invention enables thicknesses of less than 100 µm, e.g. less than 50 µm. Films of the invention with thicknesses even less than 20 µm can also be produced whilst maintaining good mechanical properties.

As previously mentioned the films of the invention have good processability properties and may enable reduction of the film thickness and thus increase the production speed of film preparation process. The production speed can be increased, e.g. up to 20%, compared to conventional film preparation process of LDPE alone or in a mixture with LLDPE.

The polymer of the invention has been found to allow the formation of films having an ideal balance of properties. They have excellent optical properties and mechanical properties and are readily processed. In particular, films exhibit low haze, high dart impact strengths, and high stiffness, Moreover, during extrusion of the composition of the invention, excellent bubble stability and temperature stability are observed.

The films of the invention exhibit high dart impact strengths. Dart drop F50 (ISO 7765/1 Method A) may be at least 300 g, preferably at least 500 g, especially at least 750 g, most especially at least 800 g. In demanding applications even more than 900 g is preferred. The upper limit of said Dart drop is not critical and may typically be e.g. 1100 g. In particular, for a 40 µm film of the invention prepared as described below under "Film Sample Preparation", Dart drop F50 (ISO 7765/1 Method A) may be at least 300 g, preferably at least 500 g, especially at least 750 g, most especially at least 800 g. In demanding applications even more than 900 g is preferred. The upper limit of said Dart drop is not critical and may typically be e.g. 1100 g.

The films exhibit excellent haze properties given the density of the polymer of the invention. The ratio of haze to film thickness is preferably less than 2.0%/µm, more preferably less than 1.6%/µm, especially less than 1.5%/µm, again especially when measured with the film sample prepared as described below under "Film Sample Preparation".

The improved processability of the films of the invention is also shown through the wall thickness distribution of the films formed, measured as described in the examples section below. A low wall thickness distribution means a very evenly formed film and is hence indicative of a processable polymer. The multimodal polymer of the invention can give rise to films having wall thickness distributions σ-2 of less than 35%, preferably less than 30%, especially less than 26%.

The films of the invention, e.g. monolayer films, may be laminated on to barrier layers as is known in the art. For food and medical applications for example, it may be necessary to incorporate a barrier layer, i.e. a layer which is impermeable to water and oxygen, into the filth structure. This can be achieved using conventional lamination techniques. Suitable barrier layers are known and include polyamide, ethylene vinyl alcohol, PET and metallised Al layers.

Viewed from another aspect therefore the invention provides a laminate comprising a film as hereinbefore defined laminated onto a barrier layer.

In such an embodiment it may be convenient to laminate the barrier layer onto two monolayer films as hereinbefore described thereby forming a 3 layer structure in which the barrier layer forms the middle layer.

The films of the invention have a wide variety of applications but are of particular interest in packaging of food and drink, consumer and industrial goods, medical devices and in heavy duty packaging. Specific applications include industrial liners, heavy duty shipping sacks, carrier bags, bread bags and freezer bags.

Other Components

The multimodal polyethylene of the invention is typically employed in films along with any other component. Other polymer components include LDPE, LLDPE or HDPE polymers. Mixtures of the multimodal polyethylenes of the invention may also be employed. The composition can also contain conventional additives such as antioxidants, UV stabilisers, acid scavengers, nucleating agents, anti-blocking agents as well as polymer processing agent (PPA).

LDPE polymers which can be used preferably have the following properties:

The LDPE polymer may have a density of 920-935 kg/m$^3$, especially 918 to 930 kg/m$^3$, e.g. 920 to 930 kg/m$^3$. The MFR$_2$ of the LDPE may range from 0.3 to 4 g/10 min, e.g. 0.2 to 2.5 g/10 min, e.g. 0.2 to 2.0 g/10 min. Suitable LDPE's are commercially available from Borealis and other suppliers.

LLDPE polymers which can be used have a density of less than 925 kg/m$^3$.

The LLDPE polymer may be formed from ethylene along with at least one C3-12 alpha-olefin comonomer, e.g. butene, hexene or octene. Preferably, the LLDPE is an ethylene hexene copolymer, ethylene octene copolymer or ethylene butene copolymer. The amount of comonomer incorporated in the LLDPE copolymer is preferably 0.5 to 12 mol %, e.g. 1 to 10% mole, especially 1.5 to 8% mole. The MFR$_2$ (melt flow rate ISO 1133 at 190° C. under a load of 2.16 kg) of the LLDPE polymer should preferably be in the range 0.01 to 20 g/10 min, preferably 0.05 to 10 g/10 min, more preferably 0.1 to 6.0. In some embodiments MFR$_2$ of less than 3.0 g/10 min may be desirable.

It is within the scope of the invention for the multimodal polyethylene of the invention to be combined with a multimodal LLDPE, e.g. a bimodal LLDPE Suitable LLDPE's can be produced analogously to polymerisation process described above for multimodal polyethylene by adjusting the process conditions, such as ethylene, comonomer and hydrogen feed, polymerisation pressures and temperatures etc, in a known manner to provide the desired LLDPE properties including density and MFR values.

Usable Ziegler Natta-based and metallocene based LLDPE's are also commercially available from Borealis and other suppliers.

Although LDPE and LLDPE are mentioned other polymers including other HDPE polymers, homopolymer or random copolymer of propylene, heterophasic block polymer of propylene, e.g. ethylene-propylene rubber could be present.

Accordingly, the multimodal MDPE of the invention can be used alone, i.e. in the absence of other polymer components, or as a blend with one or more other polymer components in different end applications such as in a film layer. In blends the amount of the multimodal MDPE is preferably at least 50 wt %, more preferably at least 80 wt %.

For film formation using a polymer mixture, e.g. a multimodal polyethylene of the invention in combination with another polymer component or simply with standard additives, it is important that the different polymer components be intimately mixed prior to extrusion and blowing of the film as otherwise there is a risk of inhomogeneities, e.g. gels, appearing in the film. Thus, it is especially preferred to thoroughly blend the components, for example using a twin screw extruder, preferably a counter-rotating extruder prior to extrusion and film blowing. Sufficient homogeneity can also be obtained by selecting the screw design for the film extruder such that it is designed for good mixing and homogenising.

The invention will now be described further with reference to the following non-limiting examples.

Determination Methods

Unless otherwise stated, the film samples used for the measurements to define the above and below properties of the films were prepared as described under the heading "Film Sample Preparation".

Density of the materials is measured according to ISO 1183: 1987 (E), method D, with isopropanol-water as gradient liquid. The cooling rate of the plaques when crystallizing the samples was 15 C/min. Conditioning time was 16 hours.

$MFR_2$ and $MFR_{21}$ are measured according to ISO 1133 at 190° C. at loads of 2.16 and 21.6 kg respectively.

Haze is measured according to ASTM D 1003. The relative haze is calculated by dividing the haze % of a film sample by the thickness of the film (haze %/μm). The film sample was a blown film sample prepared as described under "Film sample preparation".

Gloss 60° angle is measured according to ASTM D 2457

Impact resistance is determined on Dart-drop (g/50%). Dart-drop is measured using ISO 7765-1, method "A". A dart with a 38 mm diameter hemispherical head is dropped from a height of 0.66 m onto a film clamped over a hole. If the specimen fails, the weight of the dart is reduced and if it does not fail the weight is increased. At least 20 specimens are tested. The weight resulting in failure of 50% of the specimens is calculated.

Molecular weights, molecular weight distribution, Mn, Mw, MWD Mw/Mn/MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-4:2003. A waters 150CV plus instrument, equipped with refractive index detector and online viscosimeter was used with 3×HT6E styragel columns from Waters (divinylbenzene) and 1,2,4-trichlorobenzene (TCB, stabilized with 250 mg/L 2,6-Di tert butyl-4-methyl-phenol) as solvent at 140° C. and a constant flow rate of 1 mL/min. 500 μL of sample solution were injected per analysis. The column set was calibrated using universal calibration (according to ISO 16014-2:2003) with narrow MWD polystyrene (PS) standards in the range of 1.05 kg/mol to 11 600 kg/mol Mark Houwink constants were used for polystyrene and polyethylene (K: 9.54×10$^{-5}$ dL/g and a: 0.725 for PS, and K: 3.92*10$^{-4}$ dL/g and a: 0.725 for PE). All samples were prepared by dissolving 0.5-3.5 mg of polymer in 4 mL (at 140° C.) of stabilized TCB (same as mobile phase) and keeping for 2 hours at 140° C. and for another 2 hours at 160° C. with occasional shaking prior sampling in into the GPC instrument.

Rheology of the polymers was determined by frequency sweep at 190 C under nitrogen atmosphere according to ISO 6721-10, using Rheometrics RDA II Dynamic Rheometer with parallel plate geometry, 25 mm diameter plate and 1.2 mm gap. The measurements gave storage modulus (G'), loss modulus (G") and complex modulus (G*) together with the complex viscosity (η*), all as a function of frequency (ω) These parameters are related as follows: For any frequency ω: The complex modulus: $G^*=(G'2+G"2)^{1/2}$. The complex viscosity: $\eta^*=G^*/\omega$. According to the empirical Cox-Merz rule, for a given polymer and temperature, the complex viscosity as function of frequency (given in rad/s) measured by this dynamic method is the same as the viscosity as a function of shear rate for steady state flow (e.g. a capillary).

Shear thinning, that is the decrease of viscosity with G*, becomes more pronounced when the molecular weight distribution. (e.g. as measured by SEC for linear polymers) broadens. This property can be characterized by the shear thinning index, SHI, which is the ratio of the viscosity at a lower stress and the viscosity at a higher shear stress. A polymer with broad molecular weight distribution will have a higher SHI than one with a more narrow. Two polymers of equal molecular weight distribution broadness as seen by SEC, but of different molecular weights, will have about equal SHI. In the examples, shear stresses (or G*) of 2.7, 5 and 210 kPa were used as basis. Thus:

$$SHI\_2.7\_kPa/210\_Pa=\eta^*(G^*=2.7\ kPa)/\eta^*(G^*=210\ kPa)$$

Tm and Tcr both were measured according to ISO 11357-1 on Perkin Elmer DSC-7 differential scanning calorimetry. Heating curves were taken from −10° C. to 200° C. at 10° C./min. Hold for 10 min at 200° C. Cooling curves were taken from 200° C. to −10° C. per min. Melting and crystallization temperatures were taken as the peaks of endotherms and exotherms. The degree of crystallinity was calculated by comparison with heat of fusion of a perfectly crystalline polyethylene, i.e. 290 J/g.

Comonomer content (mol %) was determined by $C^{13}$NMR. The $C^{13}$NMR spectra of the polymers was recorded on Bruker 400 MHz spectrometer at 130° C. from samples dissolved in 1,2,4-trichlorobenzeneJbenzene-d6 (90/10 w/w).

TREF Determination Method:

Fractionation of the polymer samples was achieved by using analytical Temperature Rising Elution Fractionation (TREF). The TREF profiles were generated using a home made instrument, which is similar to a published design (L. Wild, T. R. Ryle, D. C. Knobeloch, I. R. Peat; J. Polym. Sci.

Polym. Phys. 1982, 20, 441). The sample was dissolved in 1,2,4-trichlorobenzene (TCB, 2 to 4 mg/mL, stabilized with 250 mg/L 2,6-Di tert butyl-4-methyl-phenol) at 145° C. for 4 hours and 2.5 mL sample solution was injected into the column at 135° C., and the latter was then cooled to 20° C. at a constant cooling rate of 4.08° C./h. The polymer was subsequently eluted from the column with 1,2,4-trichlorobenzene at a flow rate of 1 mL/min at 20° C. for a period of 10 min followed by a temperature increase from 20° C. to 135° C. at a constant heating rate of 0.8° C./min. The output during the heating phase was detected with an infrared detector (Foxboro Miran 1A CVF) operating at a wavelength of 3.46 μm and presented as a fractogram normalised to constant area.

Wall thickness Distribution δ-2 (%)

The film thickness is measured by an "Octagon thickness measurement" equipment (M-4238) with constant speed. The thickness is measured by a sensor with no contact to the polymer sample. The samples are cut in pieces with a width from 50 to 100 mm and a length of >700 mm Film Sample Preparation The following film preparation method was used for preparing the blown films used as film samples for determining the general properties of the films as defined above and below and in the examples:

Films were prepared by blown film extrusion on a small-scale commercial ANKUTEC film line using the following conditions:

Blowing Conditions: The polymer compositions were blown to films of a thickness of approximately 40 μm

| | |
|---|---|
| Die gap: | 2.2 mm |
| Screw speed: | 70 rpm |
| Temperature profile: | 180-180-220-220-220-220-220-220° C. |
| Winding speed: | 8 m/min |
| FLH: | 230 mm |
| BUR: | 1:2.5 |
| Film width: | 200 mm |

EXAMPLE 1

Catalyst Preparation:

Complex: The catalyst-complex used in the polymerisation example was a silica supported bis(n-butyl cyclopentadienyl)hafnium dibenzyl, $(n\text{-BuCp})_2\text{Hf}(CH_2Ph)_2$, and it was prepared according to "Catalyst Preparation Example 2" of WO2005/002744. The starting complex, bis(n-butyl cyclopentadienyl)hafnium dichloride, was prepared as described in "Catalyst Preparation Example 1" of said WO 2005/002744.

Activated catalyst system: Complex solution of 0.80 ml toluene, 38.2 mg $(n\text{-BuCp})_2\text{Hf}(CH_2Ph)_2$ and 2.80 ml 30 wt % methylalumoxane in toluene (MAO, supplied by Albemarle) was prepared. Precontact time was 60 minutes. The resulting complex solution was added slowly onto 2.0 g activated silica (commercial silica carrier, XPO2485A, having an average particle size 20 μm, supplied by Grace). Contact time was 2 h at 24° C. The catalyst was dried under nitrogen purge for 3 h at 50° C. The obtained catalyst had Al/Hf of 200 mol/mol; Hf 0.40 wt %.

Polymerizations: Preparation of Multimodal MDPE of the Invention

A continuously operated pilot-scale loop reactor having a volume 500 dm³ was operated at 85° C. temperature and 60 bar pressure. Into the reactor were introduced propane diluent, ethylene, hydrogen and the polymerisation catalyst prepared as described above. The ethylene concentration in the liquid phase of the loop reactor was 8.1 mol-%, the ratio of hydrogen to ethylene was 0.22 mol/kmol. The thus formed polymer had a melt index $MFR_2$ of 15 g/10 min at 27-32 kg/h.

The slurry was intermittently withdrawn from the reactor by using a settling leg and directed to a flash tank operated at a temperature of about 50° C. and a pressure of about 3 bar.

From the flash tank the powder, containing a small amount of residual hydrocarbons, was transferred into a gas phase reactor operated at 75° C. temperature and 20 bar pressure. Into the gas phase reactor also introduced additional ethylene, but-1-ene comonomer and nitrogen as inert gas in such amounts that the ethylene concentration in the circulating gas was 28% by mole, the ratio of hex-1-ene to ethylene was 9 mol/kmol and the polymer production rate was 30 kg/h. The production split between the loop and gas phase reactors was thus 39/61.

The polymer collected from the gas phase reactor was stabilised by adding to the powder 2500 ppm Irganox 1330, 2000 ppm Irganox B225, 1000 ppm Tinuvin 622 and 1500 ppm calcium stearate. The stabilised polymer was the extruded and pelletised under nitrogen atmosphere with CIM90P extruder, manufactured by Japan Steel Works. The melt temperature was 230° C., throughput 280 kg/h and the specific energy input (SEI) was 220 kWh/t.

This protocol and the properties of the formed polymer are summarised in tables 1 and 2.

TABLE 1

| Polymerization conditions | Unit | Ex 1 |
|---|---|---|
| Loop reactor: LMW component | | |
| C2 loop | mol-% | 8.1 |
| H2/C2 loop | mol/kmol | 0.22 |
| C6/C2 loop | mol/kmol | 0 |
| $MFR_2$ loop | g/10 min. | 15 |
| Density loop | kg/m3 | Homopolymer |
| Prod. rate | loop kg/h | 28 |
| Gas phase reactor: HMW component | | |
| C2 GPR | mol-% | 28 |
| H2/C2 GPR | mol/kmol | ~0 |
| C6/C2 GPR (1-hexene) | mol/kmol | 9 |
| Prod. rate GPR | kg/h | 30 |
| Pelletisation | | |
| Prod. split loop/GPR | | 39/61 |
| Irganox 1330 | ppm | 2500 |
| Irganox B225 | ppm | 2000 |
| Tinuvin 622 | ppm | 1000 |
| CaSt | ppm | 1500 |
| CIM90P extruder melt temp. | ° C. | 230 |
| CIM90P SEI (specific energy input) | kWh/t | 0.22 |

Pellet properties

TABLE 2

| | Unit | Ex 1 |
|---|---|---|
| Density, | kg/m³ | 930 |
| $MFR_2$, | g/10 min | 0.84 |
| $M_w$ | g/mol | 148 000 |
| $M_n$ | g/mol | 43 400 |
| $M_w/M_n$ | | 3.4 |
| $\eta_{2.7kPa}$ | Pa · s | 9460 |
| $SHI_{2.7/210}$ | | 4.8 |

TABLE 2-continued

|  | Unit | Ex 1 |
|---|---|---|
| $G'_{5kPa}$ |  | 780 |
| 1-hexene content | mol % | 2.13 |
| $T_m$ melting point | ° C. | 126.4 |
| $T_{cr}$ Crystallinity | % | 44.3 |
| Fraction eluting <60° C. in TREF | % | 19.1 |
| Applications |  | Film |

EXAMPLE 2

The polymer of Example 1 of the invention and a reference example of a commercially available unimodal metallocene LLDPE (comonomer hexene) of density 927 kg/m³ and MFR₂ 1.3 were processed to blown film samples according to the method described above under "Film Sample Preparation"

A number of repetitions were carried out and the results below are averages

TABLE 3

|  | Ex 1 | Ref |
|---|---|---|
| MFR₂ g/10 min | 0.84 | 1.3 |
| Density g/cm³ | 930 | 927 |
| Mw | 148000 | Not known |
| Mw/Mn | 3.4 | Not known |
| Melt Pressure [bar] | 256 | 268 |
| Melt Temp ° C. | 220 | 200 |
| Av thickness/min/max μm | 44 29/66 | 50 33/73 |
| σ-2 [%] | 21.2 | 46.9 |
| Haze | 51.7 | 52.6 |
| Gloss 60° | 25 | 19 |
| Dart Drop [g] | 1010 | 250 |

The invention claimed is:

1. A multimodal medium density polyethylene polymer obtained using single site catalysis, comprising at least:
   (A) a lower molecular weight (LMW) polyethylene homopolymer component; and
   (B) a higher molecular weight (HMW) polyethylene copolymer component which is a copolymer of ethylene and one C3-12-alphaolefin;
      wherein the multimodal medium density polyethylene polymer has a density of 925 to less than 940 kg/m³ and a comonomer content of 0.5 mol % to less than 2.5 mol %, and having an $M_w/M_n$ of 3 to 8, and wherein the multimodal medium density polyethylene polymer is formed into a film having a Dart Drop (F50 ISO7765/1 method A) of more than 800 g and haze to thickness ratio of less than 1.5%/μm.

2. A process for the manufacture of a film comprising a multimodal medium density polyethylene polymer, the process comprising
   polymerizing ethylene in the presence of a single site catalyst so as to form:
   (A) a lower molecular weight (LMW) polyethylene homopolymer component; and
   polymerizing ethylene and one $C_{3-12}$-alphaolefin in the presence of a single site catalyst and in the presence of component (A) so as to form:
   (B) a higher molecular weight (HMW) polyethylene copolymer component which is a copolymer of ethylene and one $C_{3-12}$-alphaolefin;
   to thereby form a multimodal medium density polyethylene polymer having a density of 925 to less than 940 kg/m³ and a comonomer content of 0.5 mol % to less than 2.5 mol % and having an Mw/Mn of 3 to 8;
   and forming the multimodal medium density polyethylene polymer into a film having a dart drop (F50 ISO 7765/1 method A) of more than 800 g and a haze to thickness ratio of less than 1.5%/μm.

3. The process of claim 2, wherein at least 6 wt % of the multimodal medium density polyethylene polymer elutes in TREF analysis at a temperature 60° C. or below, calculated based on the total weight of crystallizable polymer fractions, when determined using TREF analysis in the range of 20 to 135° C.

4. The process of claim 2, wherein at least 10 wt % of the multimodal medium density polyethylene polymer elutes in TREF analysis at a temperature 60° C. or below.

5. The process of claim 2, wherein the multimodal medium density polyethylene polymer has an MFR₂ of 0.01 to 5 g/10 min, as determined according to ISO 1133 at 190° C. at load of 2.16 kg.

6. the process of claim 2, wherein the multimodal medium density polyethylene polymer has a density of 929 to 936 kg/m³.

7. The process of claim 2, wherein the multimodal medium density polyethylene polymer has an MFR2 of 0.1 to 2.5 g/10 min.

8. The process of claim 2, wherein the multimodal medium density polyethylene polymer has a comonomer content of 0.5 to 2.3 mol %, a density of 929 to 936 kg/m³, an MFR2 of 0.1 to 2.5 g/10 min.

9. The process of claim 8, wherein at least 6 wt % of the multimodal medium density polyethylene polymer elutes in TREF analysis at a temperature 60° C. or below.

10. The process of claim 9, wherein at least 10 wt % of the multimodal medium density polyethylene polymer elutes in TREF analysis at a temperature 60° C. or below.

11. The process of claim 2, wherein the multimodal medium density polyethylene polymer has a comonomer content of 0.5 to 2.3 mol %, a density of 929 to 936 kg/m³, an MFR2 of 0.5 to 1.5 g/10 min, an Mw/Mn of 3 to 8, at least 10 wt %, of the multimodal medium density polyethylene polymer elutes in TREF analysis at a temperature 60° C. or below and wherein the higher molecular weight (HMW) polyethylene copolymer component is a copolymer of ethylene and butene or hexene.

12. The process of claim 2, comprising in a first liquid phase stage, polymerizing ethylene in the presence of a single site polymerisation catalyst to form the LMW component and subsequently polymerizing ethylene and at least one C3-12 alpha-olefin in the gas phase using the same polymerisation catalyst in the presence of the reaction product obtained from the first liquid stage, to form a HMW component.

* * * * *